(No Model.)  7 Sheets—Sheet 1.

H. ABBOTT.
APPARATUS FOR RECORDING MEASUREMENTS OF TIME, SPACE, OR QUANTITY.

No. 449,192.  Patented Mar. 31, 1891.

Witnesses
Chas. J. Williamson
Henry C. Hazard

Inventor
Henry Abbott, by
Chindler & Russell, his Attys.

THE NORRIS PETERS CO., PHOTO-LITHO., WASHINGTON, D. C.

(No Model.) 7 Sheets—Sheet 2.

H. ABBOTT.
APPARATUS FOR RECORDING MEASUREMENTS OF TIME, SPACE, OR QUANTITY.

No. 449,192. Patented Mar. 31, 1891.

Witnesses
Chas. J. Williamson.
Henry C. Hazard.

Inventor
Henry Abbott, by
Arindell & Russell, his Attys (No Model.) 7 Sheets—Sheet 3.
H. ABBOTT.
APPARATUS FOR RECORDING MEASUREMENTS OF TIME, SPACE, OR QUANTITY.

No. 449,192. Patented Mar. 31, 1891.

Witnesses
Chas. J. Williamson
Henry C. Hazard

Inventor
Henry Abbott, by
Dindle & Russell, his Attys (No Model.) 7 Sheets—Sheet 4.

H. ABBOTT.
APPARATUS FOR RECORDING MEASUREMENTS OF TIME, SPACE, OR QUANTITY.

No. 449,192. Patented Mar. 31, 1891.

Witnesses
Chas. J. Williamson.
Henry C. Hazard.

Inventor
Henry Abbott, by
Rindle & Russell, his Attys.

(No Model.)  7 Sheets—Sheet 5.

H. ABBOTT.
APPARATUS FOR RECORDING MEASUREMENTS OF TIME, SPACE, OR QUANTITY.

No. 449,192. Patented Mar. 31, 1891.

Witnesses
Chas. Williamson.
Henry C. Hazard.

Inventor
Henry Abbott, by
Crindle & Russell, his Attys.

(No Model.) 7 Sheets—Sheet 6.
H. ABBOTT.
APPARATUS FOR RECORDING MEASUREMENTS OF TIME, SPACE, OR QUANTITY.

No. 449,192. Patented Mar. 31, 1891.

Witnesses
Chas. Williamson
Henry C. Hazard.

Inventor
Henry Abbott, by
Crindle & Russell, his Attys (No Model.) 7 Sheets—Sheet 7.

H. ABBOTT.
APPARATUS FOR RECORDING MEASUREMENTS OF TIME, SPACE, OR QUANTITY.

No. 449,192. Patented Mar. 31, 1891.

Witnesses
Chas. J. Williamson.
Henry C. Hazard.

Inventor
Henry Abbott, by
Prindle and Russell, his Attys

THE NORRIS PETERS CO., PHOTO-LITHO., WASHINGTON, D. C.

UNITED STATES PATENT OFFICE.

HENRY ABBOTT, OF NEWARK, NEW JERSEY.

APPARATUS FOR RECORDING MEASUREMENTS OF TIME, SPACE, OR QUANTITY.

SPECIFICATION forming part of Letters Patent No. 449,192, dated March 31, 1891.

Application filed November 21, 1888. Renewed September 2, 1890. Serial No. 363,749. (No model.)

*To all whom it may concern:*

Be it known that I, HENRY ABBOTT, of Newark, in the county of Essex, and in the State of New Jersey, have invented certain new and useful Improvements in Apparatus for Recording Measurements of Time, Space, or Quantity; and I do hereby declare that the following is a full, clear, and exact description thereof, reference being had to the accompanying drawings, in which—

Fig. 21 is a like view of the front face of said card after the time worked during the day has been filled in.

Letters of like name and kind refer to like parts in each of the figures.

The object of my invention is to enable the time intervening between any two periods to be easily and accurately determined without requiring the employment of skilled assistance; to which end my said invention consists principally in an apparatus constructed and adapted to operate in the manner and for the purpose substantially as hereinafter shown.

It consists, further, in details of construction, substantially as and for the purpose hereinafter set forth.

In the carrying of my invention into practice I employ for the operative mechanism a casing which is composed of an annular body A, that is preferably constructed from wood, a top plate B, that is superimposed upon and incloses the upper open side of the body, and a bottom plate C, which is fitted into and contained within a rabbet $a$, that is provided within the lower side of said body. The top plate B is secured in place by means of screws D D, &c., which pass upward through the body A and have their upper threaded ends contained within correspondingly-threaded holes in said top plate and are only accessible from within the rabbet $a$, while to hold the bottom plate C in place there is provided a lug $c$, that extends upward into the interior of said body and engages with a pin $a'$, which projects radially inward from the latter, and a lock E, that is located opposite to said lug and is adapted to engage with a keeper $a^2$, which is secured upon said body. As thus constructed and combined, access to the interior of the casing can only be had through the bottom, so that by employing a lock that is not easily picked unauthorized manipulation of the mechanism to be placed within said casing is prevented unless some of its parts are broken.

Within the top plate B at one side is provided a circular opening $b$, which extends entirely through the same, is glazed, and contains the dial F and hands $f$ and $f'$ of a time-train G, which train has any usual form, is secured upon the lower face of said plate, and is adapted to be wound and to have its hands set from the lower side, and then only when the bottom plate has been removed.

Within the plate B, opposite to the dial-opening $b$, are provided two circular recesses $b'$ and $b^2$, which have the same diameters, are located close together, and extend about one-half way through said plate. The recess $b'$ contains a cylindrical block H, which loosely fills the same, and upon its upper face is provided with a series of raised numerals or characters $h$ and marks $h'$, that are arranged in annular form and correspond in number and relative location to the marks for indicating hours and minutes, respectively, upon a clock-dial. From the lower side of said block or die a hollow arbor $h^2$ extends downward through said plate B, and at a point below the latter is provided with a toothed wheel $h^3$. Said recess $b^2$ also contains a printing-die, which die I is precisely like the die H, except that in place of characters to represent hours there are provided figures $i$ and marks $i'$, which divide the circumference of said die into sixty equal spaces, each of which corresponds to a minute of time.

The dies H and I are each provided with a centrally-located recess $h^4$ and $i^4$, respectively, in which is loosely fitted a correspondingly-shaped die K or L, that carries upon its face a raised arrow $k$ or $l$, and within the body of such arrow has the word "hours" or "minutes." Each of said dies K and L is provided with an arbor $k'$ or $l'$, that extends downward through the hollow arbor $h^2$ or $i^2$ and through a plate M, which is secured upon or forms an extension of the back plate of the time-movement. Each of said dies K and L is provided upon its lower side with a pin $k^2$ or $l^2$, that extends into a corresponding hole in the adjacent die H or I and operates to connect it with the latter rotatively with the point of its arrow at zero, while permitting of independent movement in a line with its axis.

Journaled between the arbors $h^2$ and $i^2$ within the plates B and M is an arbor N, which is provided with a wheel $n$, that meshes with and receives motion from one of the wheels of the time-train, a pinion $n'$, which meshes with the wheel $h^3$ of said arbor $h^2$, and a wheel $n^2$, that meshes with a pinion $i^3$ upon said arbor $i^2$, the arrangement and relative proportions of said wheels and pinions being such as to cause said shaft $h^2$ and its die H to make one complete revolution in twelve hours and said arbor $i^2$ and its die I to make a complete revolution in one hour.

The dies described are to operate by being moved upward against a card, and in order that such card may be properly supported there is secured upon the plate B a housing P, that extends over said dies and contains within its lower face a block of rubber $p'$ or other suitable material, which operates as a platen and receives the blow of said dies. Said platen has a suitable elevation above said dies, and at one end and in front of the same said housing is removed to permit of the insertion of a card. Said housing is secured in place by means of screws, which pass upward through said top plate B.

For the purpose of moving the dies H and I upward the following-described mechanism is employed, viz: Spanning the arbors $k'$, $l'$, and N is a yoke Q, which is adapted to slide freely thereon in a vertical direction, and when moved upward engages with the lower ends of the hollow arbors $h^2$ and $i^2$ and carries the same with their dies in the same direction. Upon the lower side at the longitudinal center of said yoke is a hub $q$, with which engages the forked end $r$ of a lever R, that from thence extends outward and is centrally pivoted within a fixed bearing $r'$. A second lever S is pivoted at one end within a fixed bearing $s$, and from thence extends at a right angle over the outer end of the lever R and has its opposite end pivoted to the lower end of a plunger T, which plunger from thence extends upward through the top plate B and at its upper end is provided with a flat knob $t$, which is adapted to receive a blow from the hand of an operator. The plunger is held with yielding pressure at the upper limit of its motion by means of a spring $s^2$, that extends between the end of the lever S and the top plate B, while by the action of a spring $n^3$, that is placed between the wheel $n$ and the upper side of the yoke Q, the latter, with the dies H and I, is kept at the lower limit of its motion, and the outer end of the lever R is held with a yielding pressure upward against the lever S. As thus arranged it will be seen that by pressing downward upon the knob $t$ the said dies H and I will be moved upward, and when said knob is released from such pressure said parts will automatically return to their normal positions. The dies K and L are moved by two levers and a plunger R', S', and T', which are counterparts of the parts R, S, and T; but instead of the yoke Q there is journaled upon the lower end of the arbor N a disk U, which has such diameter as to cause its upper face to engage with the lower ends of the arbors $k'$ and $l'$, while from the center of the lower face of said disk a hub $u$ projects downward and is engaged by the inner end of the lever R'. The action of the mechanism described is like that used for moving the dies H and I and enables said dies K and L to be raised at will.

Ink for printing is supplied by a ribbon V, which is wound upon spools W and W, that are journaled upon the lower face of the plate B, and from such spools pass upward through suitable slots $b^3$ and $b^3$ in said plate, and from thence across the dies, said ribbon above said top plate being entirely covered by the housing P. In order that when a card is inserted beneath the platen it may be prevented from being smeared by or entangled with said ribbon, a metal strip $b^4$ is secured upon said plate B just in front of said dies, where it furnishes a bearing for the card and holds the same above said ribbon.

The inking-ribbon V is moved longitudinally by means of two spring-pawls X and X, one of which is attached to and moves with each plunger and engages with a ratchet-wheel $w$, that is secured upon the end of each spool W. Each pawl is arranged to engage with and partially rotate its spool upon the upward movement of the plunger; but before said plunger reaches the upper limit of its motion the end of said pawl passes out of engagement with the teeth of its ratchet, and only the smooth side of the former bears upon the latter and offers no resistance to a movement of said spool in an opposite direction. A flat spring Y, secured upon the top plate B, having its side in contact under pressure with each of said ratchet-wheels, operates as a brake and prevents the ribbon from becoming slack.

As the printing-dies are rotated by the time-train, the accidental or malicious stoppage of either of such dies would be liable to stop the clock. To prevent such mischance, the wheel $n$ of the arbor N is loosely journaled upon the latter and is connected therewith by means of a coiled spring $n^4$, which has one of its ends connected with said arbor and its opposite end connected with said wheel. Said spring $n^4$ has sufficient strength to drive its arbor and the die-arbors, but not sufficient to interfere with the movement of the time-train, so that in the event of the stoppage of either of said dies said time-train would keep up its movement and simply wind up said spring $n^4$, and as soon as the trouble was discovered or ceased the dies when released would be rotated until they reached the positions they would have occupied had no obstruction occurred. The length of the safety-spring will determine the length of time that the dies can be obstructed without stopping the time-train, and of course can be varied at will.

Figure 1:
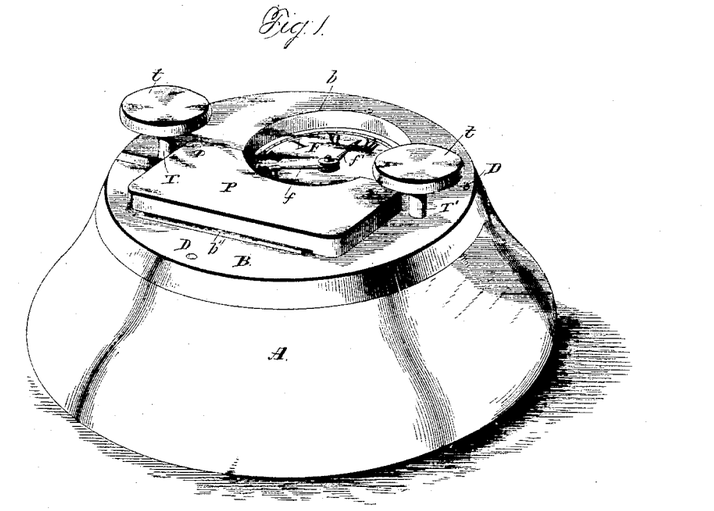
Figure 1 is a perspective view of my instrument as arranged for use.
Figure 2:
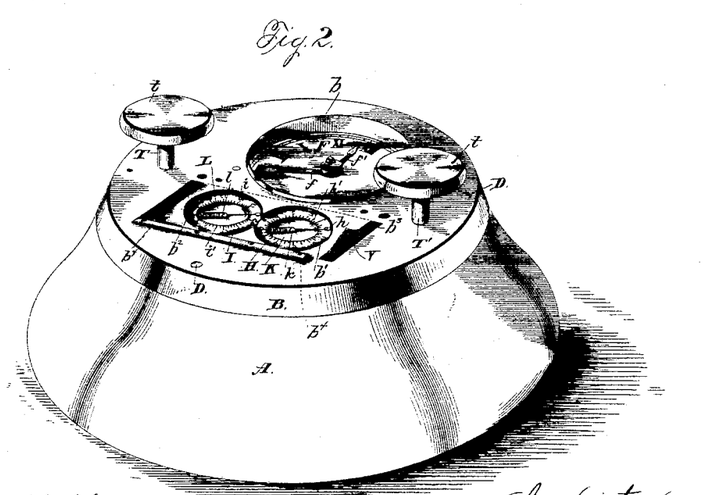
Fig. 2 is a like view of the same with the housing of the printing-dials removed.
Figure 3:
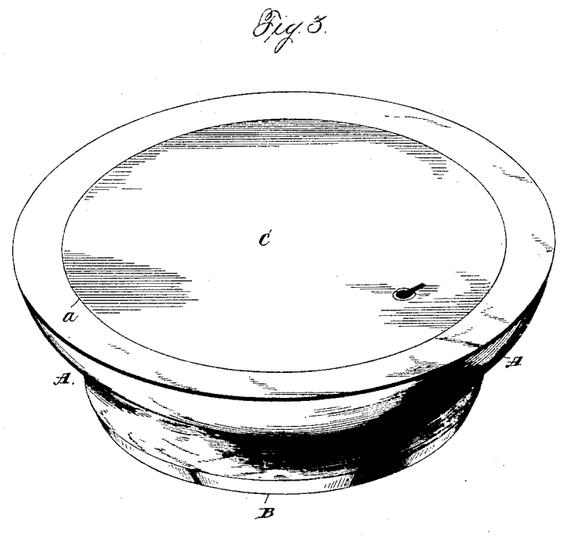
Fig. 3 is a perspective view of my instrument from the lower side when locked against intrusion.
Figure 4:
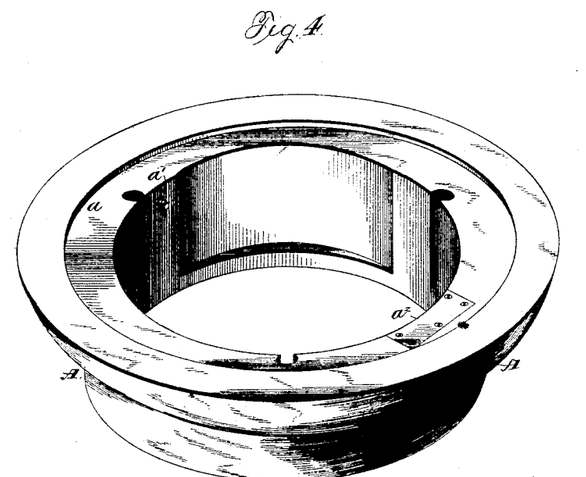
Fig. 4 is a like view of the casing with the bottom plate removed.
Figure 5:
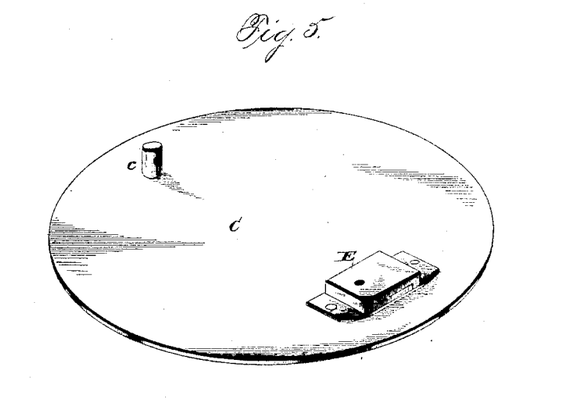
Fig. 5 is a perspective view of said bottom plate from the upper side.
Figure 6:
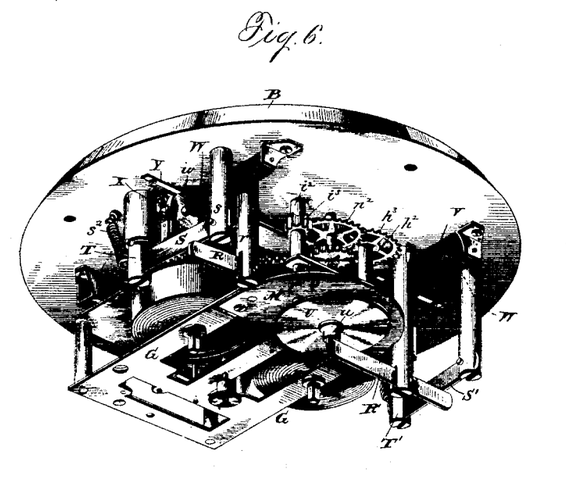
Fig. 6 is a like view from the lower side of the mechanism separated from the casing.
Figure 7:
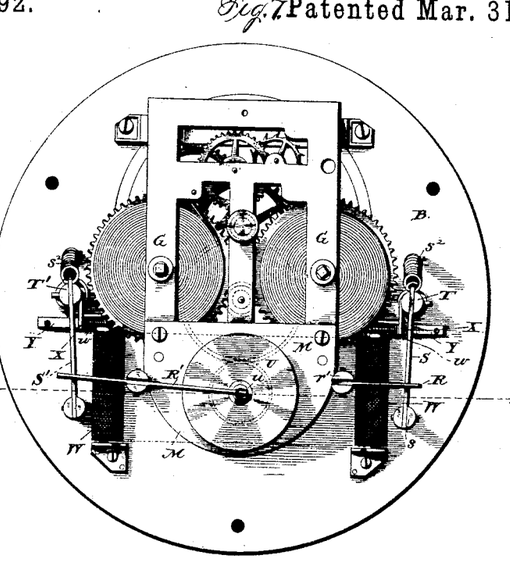
Fig. 7 is a plan view of said mechanism from the lower side.
Figure 8:
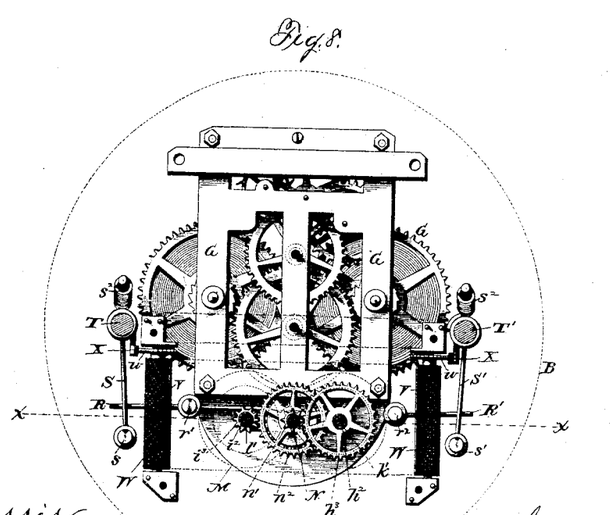
Fig. 8 is a like view of the same from the upper side.
Figure 9:
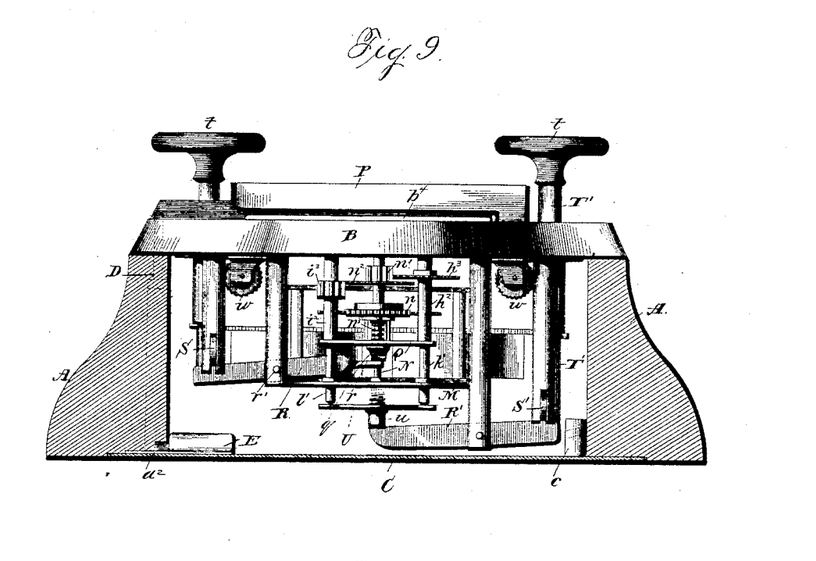
Fig. 9 is an elevation of said mechanism from the end containing the printing devices.
Figure 10:
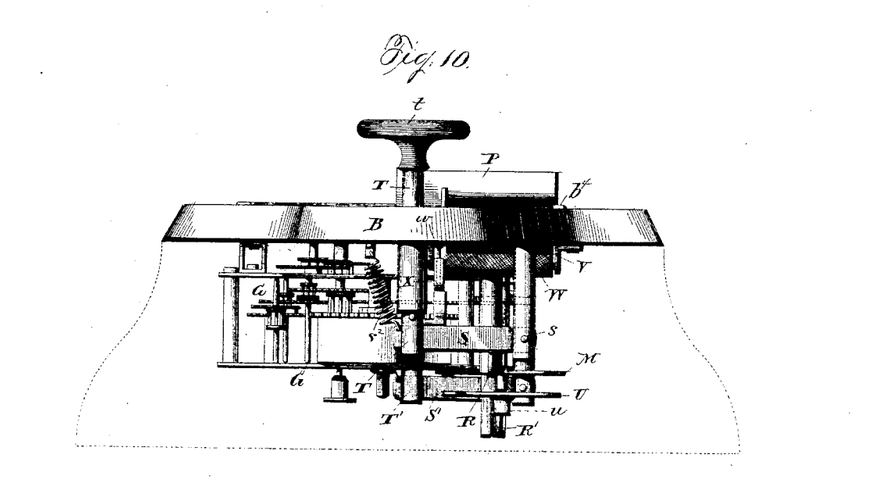
Figs. 10 and 11 are elevations of opposite sides of the same.
Figures 11, 12, 13, 14, 15:
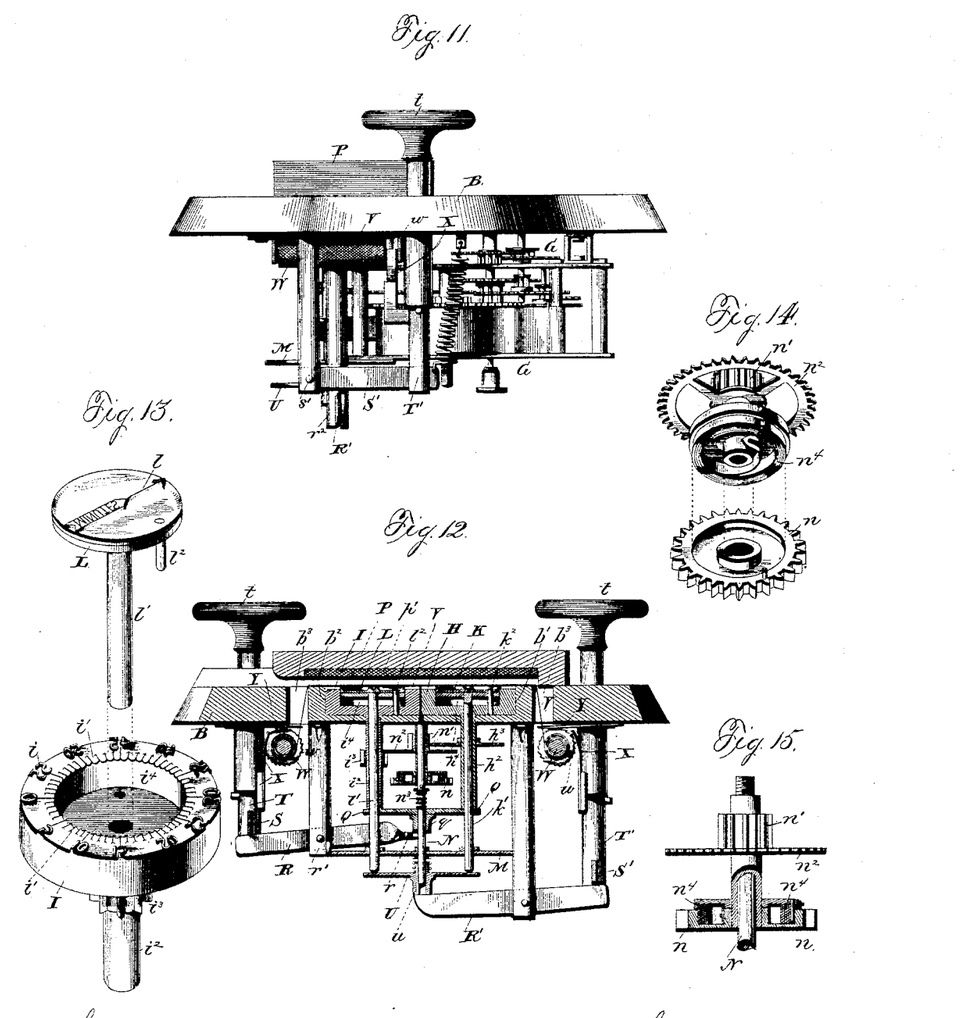
Fig. 12 is a vertical section upon lines $x\ x$ of Figs. 7 and 8.
Fig. 13 is an enlarged perspective view of an arrow-printing die and of a minutes-printing die separated from each other.
Fig. 14 is a like view of the spring-wheel connection between the time-train and the printing mechanism, the parts being separated from each other.
Fig. 15 is a vertical section of the same when united.
Figure 16:
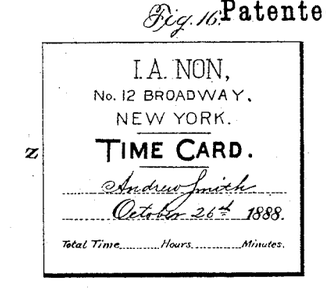
Fig. 16 is a plan view of the face of a time-card when ready for use.
Figure 17:
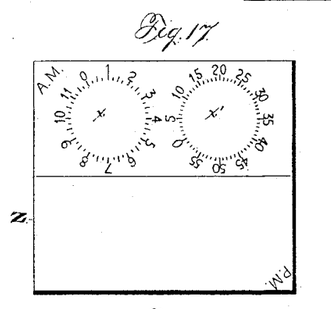
Figs. 17 and 18 are like views of the rear face of the same when stamped for commencement of work during the forenoon and its close at noon.
Figure 18:
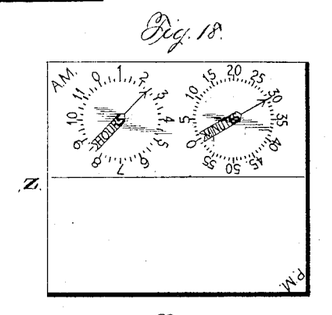
Figure 19:
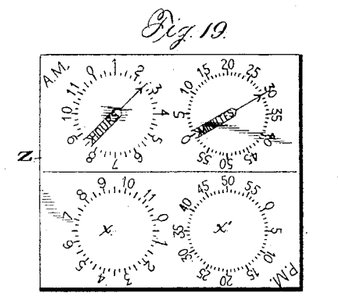
Figs. 19 and 20 are plan views of the rear face of said card when stamped at the commencement and close of the afternoon work.
Figure 20:
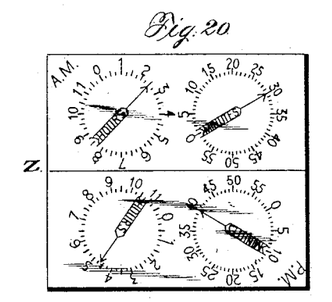
Figure 21:
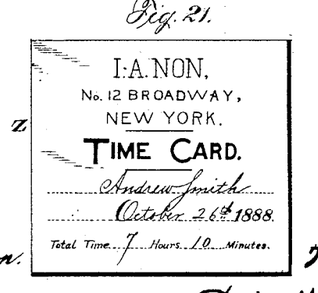

The apparatus is now complete, and is used as follows, viz: When an operative goes on duty—as, for instance, at 9.30 a. m.—he presents a card Z, upon the face of which are written his name and the date, and upon the back is divided centrally and the divisions marked "A. M." and "P. M.," respectively. This card is placed in position for stamping with the proper division of its back over the printing-dies, after which the plunger T is pressed downward, so as to print upon the A. M. section of said card two diagrams $x$ and $x'$, which are respectively fac-similes of the hours and minutes series of figures, as shown in Fig. 17. If, as is usual, work is suspended at noon, the operative presents his card to the time-keeper, who replaces it within the stamp in the position it before occupied, and pressing downward the plunger T' prints within the diagrams $x$ and $x'$ impressions of the hours and minutes arrows, of which the point of the former is located midway between the figures "2" and "3" of the hours-diagram $x$, and the point of the minutes-arrow is in juxtaposition with the figure 30 of the minutes-diagram $x'$, and shows that said operative has worked two and one-half hours. At one o'clock, when work is resumed, the operative again presents his card, and within the P. M. section of the same are stamped the hours and minutes diagrams $x$ and $x'$, respectively, as shown in Fig. 19, and when he quits work—say at 5.40—his ticket is replaced and stamped with the arrows, the hours arrow-point being located between the figures "4" and "5" of the hours-diagram $x$, and the minutes arrow-point being in juxtaposition with the figure "40" of the minutes-diagram $x'$, as seen in Fig. 20, which shows that the afternoon's work covers four hours and forty minutes. The time-keeper now adds the time indicated by the A. M. and P. M. diagrams and inserts the total—seven hours and ten minutes—within the blank spaces provided upon the face of the card, as seen in Fig. 21, which card is then ready for the paymaster, and, when paid, becomes his voucher for the payment made. The data furnished by the card is equally plain to the operative and to the paymaster, and is all that is necessary for the settlement of the wages due the former. As the record is produced by accurate mechanism, its correctness is beyond question and no differences can arise between employé and employer as to the amount of time to be paid for.

This apparatus is useful wherever it is desired to make a record of fractions of a day—as, for instance, in case of 'longshoremen and other workmen who work at irregular periods and are paid by the hour; for messenger service, where the charges to customers are by the hour; in billiard-saloons, when the charges are governed by the time tables are used; in factories, where it is desired to know the time consumed by operatives in doing any particular piece of work; in the running of trains; in chemical, photographic, scientific, and experimental operations, &c., and it can be operated by a boy or by any person who has sufficient intelligence to place the card in position and to press down the proper plunger.

Having thus described my invention, what I claim is—

1. In a machine for measuring intervals, a rotatable dial provided upon its face with a series of progressive characters and an independently-moving pointer, substantially as and for the purpose specified.

2. In a machine for measuring and recording intervals, the combination of a rotatable die that is provided with a series of progressive printing characters and a pointer, and mechanism whereby said characters and pointer may be separately printed upon a card or ticket, substantially as and for the purpose shown.

3. In a machine for measuring and recording intervals of time, the combination of a rotatable printing-die that is provided with an annular series of progressive numeral-type, a second die which is combined rotatively with the numeral-type die and is provided with a pointer-type that is in juxtaposition with the zero-type of the series, a time-train that is adapted to rotate said dies with a predetermined velocity, and mechanisms, substantially as described, which are adapted to move said dies separately against a suitably-supported ticket, substantially as and for the purpose set forth.

4. In a machine for measuring and recording intervals of time, the combination of two rotatable printing-dies, each of which is provided with an annular series of progressive numeral-type and contains a second die that is combined therewith rotatively and has a pointer-type that is in juxtaposition with the zero-numeral of the series, a time-train which is adapted to rotate said dies with different relative velocities, a mechanism, substantially as described, that is adapted to simultaneously raise said numeral-dies against a suitably-supported ticket, and another mechanism, substantially as described, which is adapted to simultaneously and independently raise said pointer-dies against such ticket, substantially as and for the purpose shown.

5. In a machine for measuring and recording intervals of time, the combination of a rotatable printing-die that is provided with an annular series of progressive numeral-type, a second die which is contained within and combined rotatively with the numeral-type die and is provided with a pointer-type that is in juxtaposition with the zero-type of the series, a time-train that is adapted to rotate said dies with a predetermined velocity, mechanisms, substantially as described, which are adapted to move said dies separately against a ticket, and a yielding backing or bed for such ticket, substantially as and for the purpose set forth.

6. In a machine for measuring and recording intervals of time, the combination of two rotatable printing-dies, each of which is provided with an annular series of progressive numeral-type and contains a second die that is combined therewith rotatively and has a pointer-type that is in juxtaposition with the zero-numeral of the series, a time-train which is adapted to rotate said dies with different relative velocities, a mechanism, substantially as described, that is adapted to simultaneously raise said numeral-dies against a suitably-supported ticket, a second mechanism which is adapted to simultaneously and independently raise said pointer-dies against such ticket, and a yielding backing or bed for the latter, substantially as and for the purpose shown and described.

7. In a machine for measuring and recording intervals of time, the combination of a rotatable printing-die that is provided with an annular series of progressive numeral-type, a second die which is contained within and combined relatively with the numeral-type die and is provided with a pointer-type that is in juxtaposition with the zero-type of the series, a time-train that is adapted to rotate said dies with a predetermined velocity, mechanisms which are adapted to move said dies separately against a ticket, a mechanism that is adapted to form a backing or bed for such ticket, and an automatically-movable inked ribbon which is interposed between said dies and ticket, substantially as and for the purpose specified.

8. In a machine for measuring and recording intervals of time, the combination of two rotatable printing-dies, each of which is provided with an annular series of progressive numeral-type and contains a second die that is combined therewith rotatively and has a pointer-type that is in juxtaposition with the zero-numeral of the series, a time-train which is adapted to rotate said dies with different relative velocities, a mechanism that is adapted to simultaneously raise said numeral-dies against a suitably-supported ticket, a second mechanism which is adapted to simultaneously and independently raise said pointer-dies against such ticket, a mechanism that is adapted to form a backing or bed for the same, and an inked ribbon which is interposed between said dies and ticket, substantially as and for the purpose shown.

9. In a machine for measuring and recording intervals of time, the combination, in a housing for inclosing the operative parts thereof, of a hollow body, a top plate to which said operative parts are secured and by which they are supported, said plate being secured to said body by fastenings placed in or removed from position from within the body, and a bottom consisting of a removable plate, which, when in place, may be secured to the body by means of a lock, substantially as and for the purpose shown.

10. In a machine for measuring and recording intervals of time, the combination, in a housing for inclosing the operative parts thereof, of an annular body provided with a rabbet in its lower side, a top plate to which said operative parts are secured and by which they are supported, said plate being secured to said body by fastenings placed in or removed from position from within the body, and a bottom consisting of a plate that may be contained within the rabbet in the lower side of the annular body and secured therein by means of a lock, substantially as and for the purpose set forth.

11. In a ribbon-stamp, in combination with an inked ribbon, a stationary bearing-strip which is arranged upon the top plate adjacent to the dies and operates to support a card or ticket above and hold the same out of contact with the face of said ribbon while being placed in or removed from position for stamping, substantially as and for the purpose shown and described.

In testimony that I claim the foregoing I have hereunto set my hand this 25th day of October, 1888.

HENRY ABBOTT.

Witnesses:
JOHN E. EUSTIS,
HENRY G. SCHULTZ.